US010165820B2

(12) United States Patent
Kim

(10) Patent No.: US 10,165,820 B2
(45) Date of Patent: *Jan. 1, 2019

(54) VALVE ASSEMBLY FOR CONTROLLING FLOW DIRECTION OF FLUID BASED ON ROTATION ANGLE

(71) Applicant: Yong Soo Kim, Changwon-si (KR)

(72) Inventor: Yong Soo Kim, Changwon-si (KR)

( * ) Notice: Subject to any disclaimer, the term of this patent is extended or adjusted under 35 U.S.C. 154(b) by 37 days.

This patent is subject to a terminal disclaimer.

(21) Appl. No.: 15/099,792

(22) Filed: Apr. 15, 2016

(65) Prior Publication Data

US 2016/0319948 A1   Nov. 3, 2016

(30) Foreign Application Priority Data

Apr. 29, 2015  (KR) .................. 10-2015-0060582

(51) Int. Cl.
*F16K 15/18* (2006.01)
*A43B 3/24* (2006.01)
(Continued)

(52) U.S. Cl.
CPC ................ *A43B 3/24* (2013.01); *A43B 3/103* (2013.01); *A43B 3/108* (2013.01); *A43B 3/12* (2013.01);
(Continued)

(58) Field of Classification Search
CPC ........... A43B 3/24; A43B 3/103; A43B 3/108; A43B 3/12; A43B 3/128; A43B 13/20; A43B 13/203; F16K 15/14
See application file for complete search history.

(56) References Cited

U.S. PATENT DOCUMENTS 4,346,731 A   8/1982  Sigworth
4,446,634 A   5/1984  Johnson et al.
(Continued)

FOREIGN PATENT DOCUMENTS

GB   1217554 A   12/1970
JP   H10196817 A   7/1998
(Continued)

OTHER PUBLICATIONS

European Search Report for corresponding European Patent Application No. 16164855.5 dated Sep. 29, 2016.
(Continued)

*Primary Examiner* — P. Macade Nichols
(74) *Attorney, Agent, or Firm* — Hauptman Ham, LLP

(57) ABSTRACT

A valve assembly includes a rotating shaft 16 rotatably supported and having an internal passage 20 formed within the rotating shaft, first and second connecting portions 26 and 28 connected to both sides of the internal passage within the rotating shaft and adapted to externally send a fluid passing through the internal passage and to receive an external fluid, and a check ball 18 embedded in the internal passage and adapted to control a flow of the fluid. Furthermore, check ball seating portions 24a and 24b adapted to communicate with the first connecting portion and the second connecting portion and to have the check ball seated therein are formed on both insides of the internal passage 20. When the internal passage 20 is inclined by rotation of the rotating shaft 16, the check ball closely adheres to a check ball seating portion at a low position due to gravity or buoyancy and restricts a fluid flow from the internal passage to any one of the first and the second connecting portions.

4 Claims, 3 Drawing Sheets

(51) Int. Cl.
  *A43B 13/20* (2006.01)
  *A43B 3/12* (2006.01)
  *F16K 5/04* (2006.01)
  *F16K 15/04* (2006.01)
  *A43B 3/10* (2006.01)
  *F16K 1/14* (2006.01)

(52) U.S. Cl.
  CPC .............. *A43B 3/128* (2013.01); *A43B 13/20* (2013.01); *A43B 13/203* (2013.01); *F16K 1/14* (2013.01); *F16K 5/0407* (2013.01); *F16K 15/04* (2013.01); *F16K 15/183* (2013.01)

(56) References Cited

U.S. PATENT DOCUMENTS

| | | | |
|---|---|---|---|
| 4,489,744 A | | 12/1984 | Merrill |
| 5,893,219 A | * | 4/1999 | Smith ...................... A43B 5/00 36/29 |
| 9,795,183 B2 | * | 10/2017 | Kim ........................ A43B 3/24 |

FOREIGN PATENT DOCUMENTS

| | | | |
|---|---|---|---|
| JP | 2013204698 A | 10/2013 | |
| KR | 10-2005-0122149 A | 12/2005 | |
| KR | 20-0431329 Y1 | 11/2006 | |

OTHER PUBLICATIONS

Japanese Office Action dated Mar. 14, 2017 in connection with the counterpart Japanese Patent Application No. 2016-083352, with Machine Translation.

\* cited by examiner

VALVE ASSEMBLY FOR CONTROLLING FLOW DIRECTION OF FLUID BASED ON ROTATION ANGLE

REFERENCE TO RELATED APPLICATIONS

This application claims the priority benefit of Korean Patent Application No. 10-2015-0060582 filed on Apr. 29, 2015, the entire contents of which are incorporated herein by reference.

FIELD OF THE INVENTION

The present invention relates to a valve assembly capable of controlling the flow direction of a fluid and, more particularly, to a valve assembly configured to regulate a fluid passing through a rotating shaft based on a rotation direction of the rotating shaft.

BACKGROUND OF THE INVENTION

In general, a check valve means a valve assembly configured to control a fluid flow only in one direction. The check valve permits a fluid to flow in a first direction, but controls the fluid so that it does not flow in a second direction opposite the first direction. Various structures using a ball or elastic plate have been known as an internal structure for permitting a flow of a fluid only in one direction.

Furthermore, it is impossible for such a conventional check valve to control a flow of a fluid in an opposite direction because the flow direction of the fluid has been determined. That is, if the check valve is installed so that a fluid flows only in a first direction when it is installed in a pipe, the fluid cannot flow in a second direction opposite the second direction in the state in which the check valve has been installed. Accordingly, in order for the fluid to flow in the second direction opposite the first direction, an existing valve must be replaced. Accordingly, the conventional check valve has a disadvantage in that a user cannot control the flow direction of a fluid in a required direction.

SUMMARY OF THE INVENTION

The present invention provides a valve assembly capable of controlling the flow direction of a fluid by a user' selection.

The present invention provides a valve assembly which has a simple structure and can control the flow direction of a fluid.

According to the an aspect of the invention, a valve assembly includes, a rotating shaft having an internal passage formed therein and supported being rotatable; a first and second connecting portions connected to both sides of the internal passage and receiving fluid from the internal passage and sending fluid to the internal passage from outside; and a check ball embedded in the internal passage and adapted to control the direction of fluid flow. And a first and second check ball seating portions in which the check ball is seated are formed on both inner side of the internal passage. When the internal passage is inclined by a rotation of the rotating shaft, the check ball contacts closely to a check ball seating portion at a low position due to a setting force, and permits a flow of a fluid in only one direction from the internal passage to the first connecting portion or the second connecting portion which is at high position.

The valve of the invention further comprise, a first fluid storage casing connected to the first connecting portion, and a second fluid storage casing connected to the second connecting portion, Here the fluid can flow between the first storage casing and the second storage casing in only one direction depending on the position of the check ball.

In an aspect, a valve assembly includes, a rotating shaft having an internal passage formed therein and supported being rotatable; a first and second connecting portions connected to both sides of the internal passage and receiving fluid from the internal passage and sending fluid to the internal passage from outside; and a check ball embedded in the internal passage and adapted to control the direction of fluid flow. And a first and second check ball seating portions in which the check ball is seated are formed on both inner side of the internal passage. When the internal passage is inclined by a rotation of the rotating shaft, the check ball contacts closely to a check ball seating portion at a high position due to buoyancy, and permits a flow of a fluid in only one direction from the internal passage to the first connecting portion or the second connecting portion which is at low position.

In this embodiment, the valve of the invention further comprise, a first fluid storage casing connected to the first connecting portion, and a second fluid storage casing connected to the second connecting portion, Here the fluid can flow between the first storage casing and the second storage casing in only one direction depending on the position of the check ball.

In the valve assembly according to an embodiment of the present invention, a fluid within the rotating shaft can flow only in one direction based on inclination of the rotating shaft. Accordingly, there is an advantage in that a user can easily select a required flow direction of a fluid by manipulating the rotation of the central rotating shaft.

Furthermore, in accordance with an embodiment further including the first fluid storage casing and the second fluid storage casing, the valve assembly and the fluid storage casing can be assembled, and a flow of a fluid in both directions within the assembly can be controlled based on an operation of the rotating shaft. Accordingly, it is expected that the valve assembly capable of controlling the flow direction of a fluid by a rotation manipulation of the rotating shaft according to an embodiment of the present invention can be applied to various industrial field.

DETAILED DESCRIPTION OF THE INVENTION

Embodiments of the present invention are described in detail below with reference to the accompanying drawings.

Figure 1:
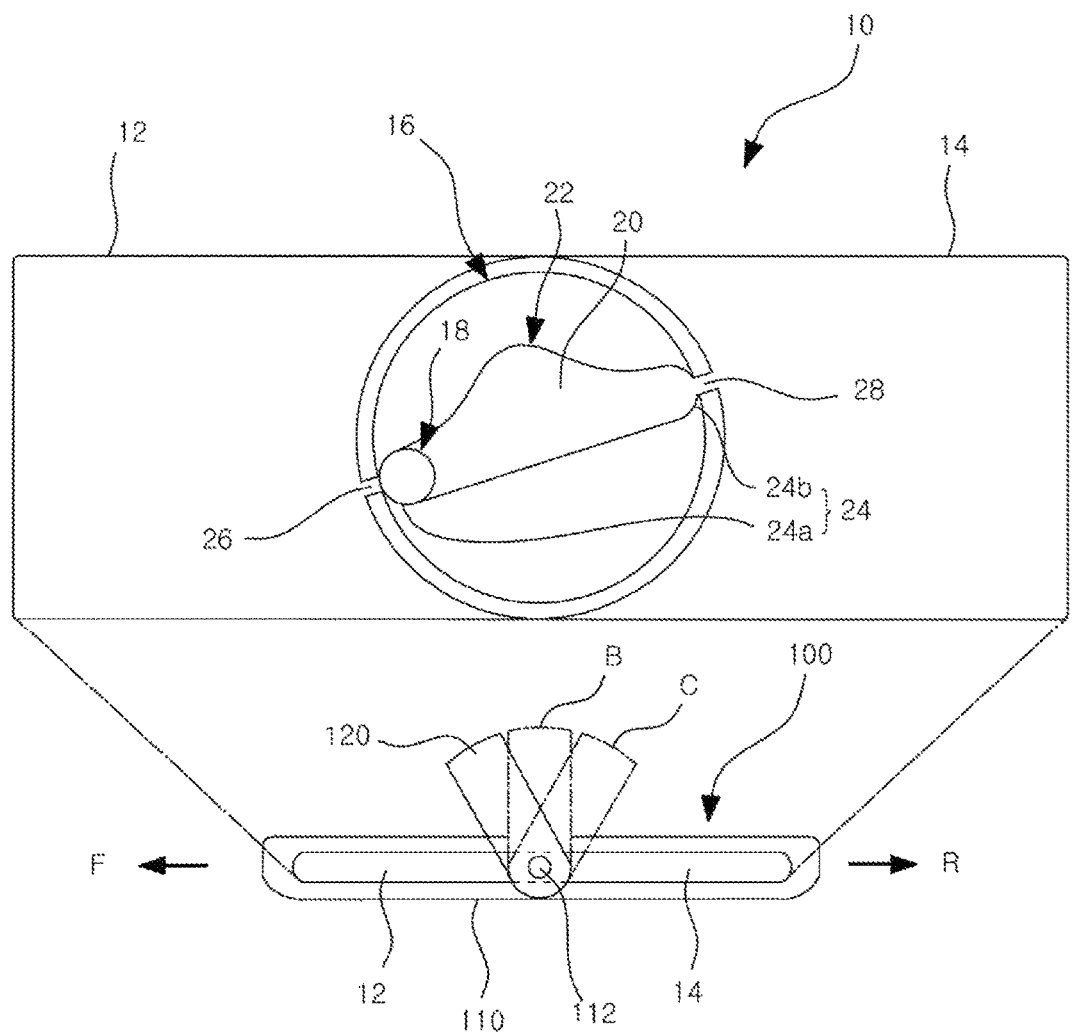
FIG. 1 is an exemplary sectional view showing an example in which a valve assembly according to an embodiment of the present invention is applied to a slipper (or sandal).
Figure 2A:
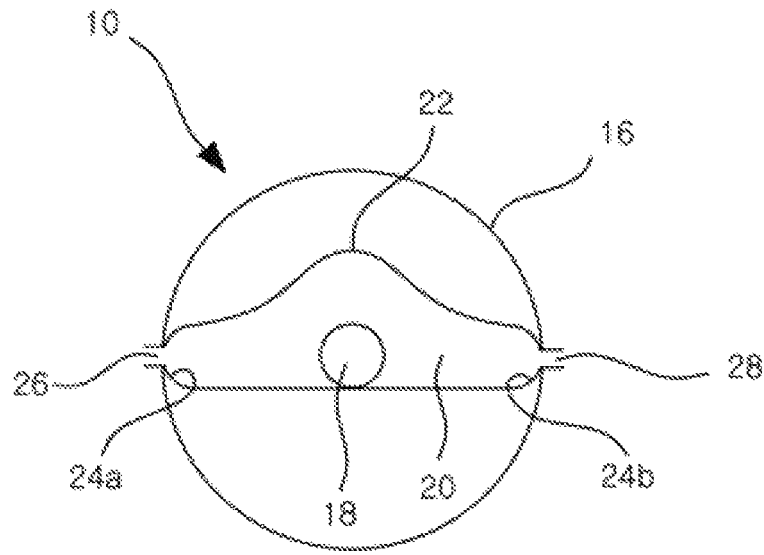
FIGS. 2A and 2B are exemplary sectional views showing the flow direction of a fluid based on a rotation angle within the valve assembly according to an embodiment of the present invention.
Figure 2B:
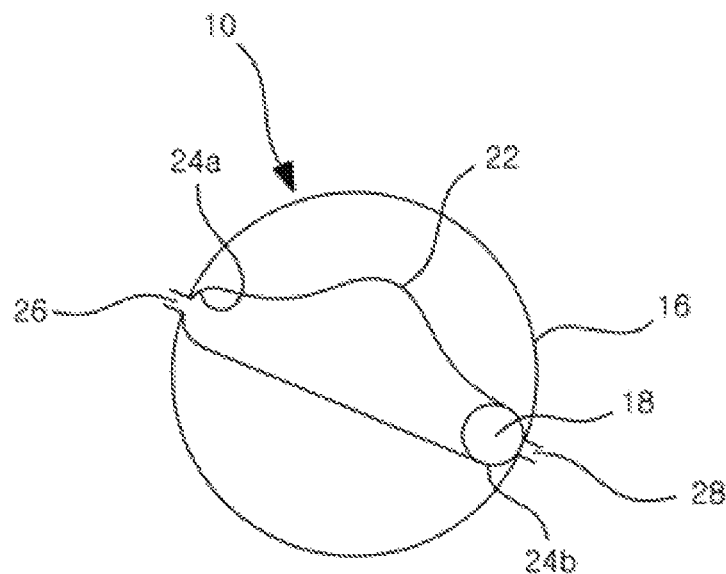
Figure 3:
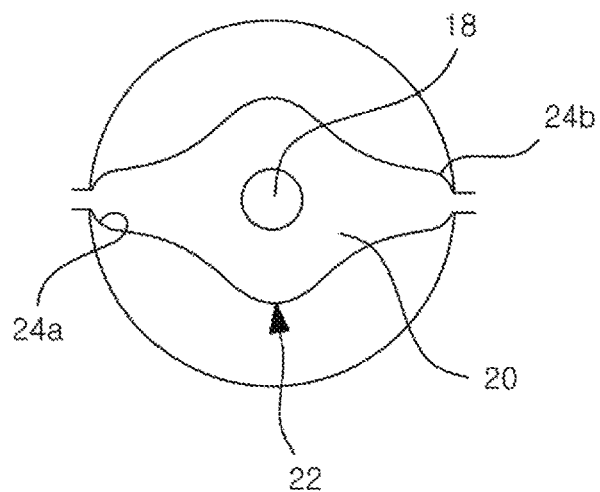
FIG. 3 is an exemplary plan view of the valve assembly according to an embodiment of the present invention.

FIG. 1 is an exemplary diagram showing an example in which a valve assembly according to an embodiment of the present invention is applied to a slipper (or sandal), and FIGS. 2 and 3 show the valve assembly itself according to an embodiment of the present invention. As shown in FIGS. 1 to 3, the valve assembly 10 according to an embodiment of the present invention has been designed to determine the direction of a fluid passing through an internal passage 20 formed in a rotating shaft 16 based on a rotation angle of the rotating shaft 16.

The rotating shaft 16 has the internal passage 20 therein. The internal passage 20 will be inclined clockwise or counterclockwise by the rotation of the rotating shaft 16 within a predetermined range. A check ball 18 is placed in the internal passage 20 of the rotating shaft 16. The check ball 18 moves by a setting force or buoyancy, thereby determining the flow direction of the fluid in the internal passage 20.

An example in which the valve assembly 10 according to an embodiment of the present invention is applied to an external device is described below. For example, the internal passage 20 is connected to a first fluid casing 12 and a second fluid casing 14 respectively on the outside of the rotating shaft. Accordingly, the first fluid casing 12 and the second fluid casing 14 are configured to selectively supply a fluid from one side to the other side through the internal passage 20. More specifically, the first fluid casing 12 is connected to the internal passage 20 through a first connecting portion 26, and the second fluid casing 14 is connected to the internal passage 20 through a second connecting portion 28.

In this case, the fluid casings 12 and 14 may be made of a flexible or elastic material, and the first and the second connecting portions 26 and 28 may also be made of a flexible or elastic material. For example, the connecting portions 26 and 28 may be made of rubber or synthetic resin. And the connecting portions 26 and 28 may be designed to have a bellows form. That is, the connecting portions 26 and 28 may have a sufficient marginal or potential length or flexibility capable of absorbing the rotation of the rotating shaft 16 within a predetermined rotation range.

The fluid can flow between the internal passage 20 and the fluid casings 12 and 14 via the first connecting portion 26 and the second connecting portion 28 formed on both ends of the internal passage 20. The check ball seating portions 24a and 24b are formed in the inner ends of internal passage 20 joining the respective connecting portions 26 and 28. The check ball seating portions 24 are formed to have a corresponding shape to ball 18. That is to say the check ball 18 can closely adhere to the ball seating portions 24 or the check ball 18 can have a close contact to any one of ball seating portions 24. For example, the check ball seating portion 24 may be formed to have a hemispherical concave portion or a partial concave and globular shape. In this case, the first connecting portion 26 and the second connecting portion 28 may be installed in opposite direction. The check ball seating portions 24a and 24b respectively connected to the first connecting portion 26 and the second connecting portion 28 may be installed in opposite directions.

The check ball 18 may regulate a flow of the fluid in one direction only when it is seated in any one of the seating portions 24. For example, the check ball 18 is unable to regulate a flow of the fluid in the middle portion 22 of the internal passage 20. That is, as may be seen from FIGS. 2A and 3, the check ball 18 cannot regulate a flow of the fluid in the middle portion 22 of the internal passage 20 because the middle portion 22 has a diameter or cross section greater than that of the check ball 18. FIG. 3 shows the state in which the check ball 18 has been placed in the middle portion 22 of the internal passage 20 in a plan view. As may be seen from FIGS. 2 and 3, the check ball 18 cannot block a flow of the fluid because the middle portion 22 of the internal passage 20 has a greater width and height.

An example in which the valve assembly 10 configured as described above is applied to a slipper 100 is described below. As shown in FIG. 1, in general, the slipper 100 includes a body 110 on which a foot of a user is placed and an instep strap (which is referred herein-after as "foot top rack") 120 rotatably supported in the middle portion of the body 110. Furthermore, the first fluid casing 12 is installed in the front F of the body 110 of the slipper, and the second fluid casing 14 is installed in the rear R of the body 110 of the slipper.

And the rotating shaft 16 is installed in the body 110 of the slipper between the first fluid casing 12 and the second fluid casing 14. The rotating shaft 16 may be installed to operate in conjunction with the foot top rack 120 of the slipper 100, for example, to operate in conjunction with the support shaft 112 of the foot top rack 120. Furthermore, as shown by a solid short line in FIG. 1, when the foot top rack 120 is forward rotated at an angle, the valve assembly 10 becomes the state shown in FIG. 1. At this time, the rotating shaft 16 has been rotated at the same angle in a counterclockwise direction that is the same direction as the foot top rack 120.

The front portion of the internal passage 20 becomes low in the state in which the rotating shaft 16 has been rotated counterclockwise and inclined at an angle as shown in FIG. 1. Accordingly, the check ball 18 is seated in the first check ball seating portion 24a in front of the first connecting portion 26 because it sinks down by a setting force. In the stated shown in FIG. 1, the check ball 18 has a close contact to the first check ball seating portion 24a, to the extent that the fluid cannot flow from the internal passage 20 to the first connecting portion 26. Also in this state, since the check ball 18 blocks the passage to the first connecting portion 26, a flow of the fluid from the internal passage 20 to the first connecting portion 26 is prevented. That is, in this state, a flow of the fluid from the second fluid casing 14 to the first fluid casing 12 cannot be allowed.

However, when the fluid flows from the first fluid casing 12 to the internal passage 20 through the first connecting portion 26, the check ball 18 cannot prevent the flow of the fluid. Accordingly, the fluid in the first fluid casing 12 becomes the state in which the fluid can enter the second fluid casing 14 through the internal passage 20. That is, the fluid can move from the first fluid casing 12 in front of the body 110 of the slipper 100 to the second fluid casing 14 in the rear of the body 110 in the state in which the foot top rack 120 of the slipper 100 has been rotated at an angle to the front direction as indicated by the solid line in FIG. 1.

If the valve assembly 10 is applied to the slipper 100 as described above, in the state in which the foot top rack 120 of the slipper 100 has been rotated counterclockwise at an angle as indicted by the solid line, the fluid may move from the first fluid storage casing 12 on the front side of the body 110 of the slipper 100 to the second fluid storage casing 14 on the back side of the body 110 of the slipper 100.

That is, when a user wears the slipper 100 in the state in which the front of the slipper 100 is forward, the fluid can flow from the first fluid storage casing 12 to the second fluid storage casing 14. But the fluid cannot flow from the second fluid storage casing 14 to the first fluid storage casing 12. The top side of foot inclines high rearward, generally. Thus when a user wears the slipper, the foot top rack 120 is directed toward, that is to say the foot top rack 120 rotates counterclockwise as shown in FIG. 1 with solid line.

When a user wears the slipper, the foot top rack is rotated toward the front side. In this state, when the user presses the front portion of the body 110 of the slipper 100 with his or her sole, the fluid may move from the first fluid casing 12 to the second fluid casing 14. Accordingly, the height of the rear portion of the body 110 of the slipper 100 will be increased, and the height of the front portion of the body 110 of the slipper 100 will be decreased.

In this case, an operation of pressing the front portion of the body 110 of the slipper 100 may be the same as an operation of pressing the first fluid casing 12. Such an operation can be sufficiently performed in a process of wearing the slipper and while walking. When any one of the first fluid casing 12 and the second fluid casing 14 is pressurized by such an operation of the user, one of the first fluid casing and the second fluid casing can be expanded and the other of the first fluid casing and the second fluid casing can be contracted by a movement of the fluid through the internal passage 20, thereby being capable of adjusting the height of the front and rear of the slipper.

And in the state in which the foot top rack 120 stands upright as indicated by B in FIG. 1, the valve assembly 10 becomes the state shown in FIG. 2A. This may be said to be a neutral state that is not the state in which the user has not worn the slipper. The state shown in FIG. 2B is opposite the state shown in FIG. 1. This may be said to be the state in which the foot top rack 120 of the slipper 100 becomes the state indicated by C in FIG. 1. In this state, the user has worn the slipper in an opposite direction, that is, the user has worn the rear R of the slipper 100 forward.

In this state, when the foot top rack 120 becomes the state indicated by C in FIG. 1, the rotating shaft 16 is clockwise rotated in an angle range, thus becoming the state shown in FIG. 2B. The check ball 18 sinks down and closely contacts to the second check ball seating portion 24b in the rear, thus blocking the second connecting portion 28. Accordingly, in this state, the fluid can move from the second fluid casing 14 to the first fluid casing 12, but a flow of the fluid in an opposite direction is not permitted.

And when the user has worn the slipper 100 in a reverse direction, and thus the foot top rack 120 has been inclined toward the rear R. In this state, the fluid can move from the second fluid casing 14 to the first fluid casing 12 within the body 110 of the slipper 100 as described above. Accordingly, the fluid can flow from the second fluid casing 14 to the first fluid casing 12 in the front F by a force generated by the sole of the user pressing the second fluid casing 14, thereby raising the body of the front portion up.

In accordance with the first embodiment described above, an example in which the check ball 18 of the valve assembly 10 sinks down due to the setting force has been described. In this case, the check ball 18 may be made of metal having greater specific gravity than the fluid, and the fluid may be gas.

Figure 4:
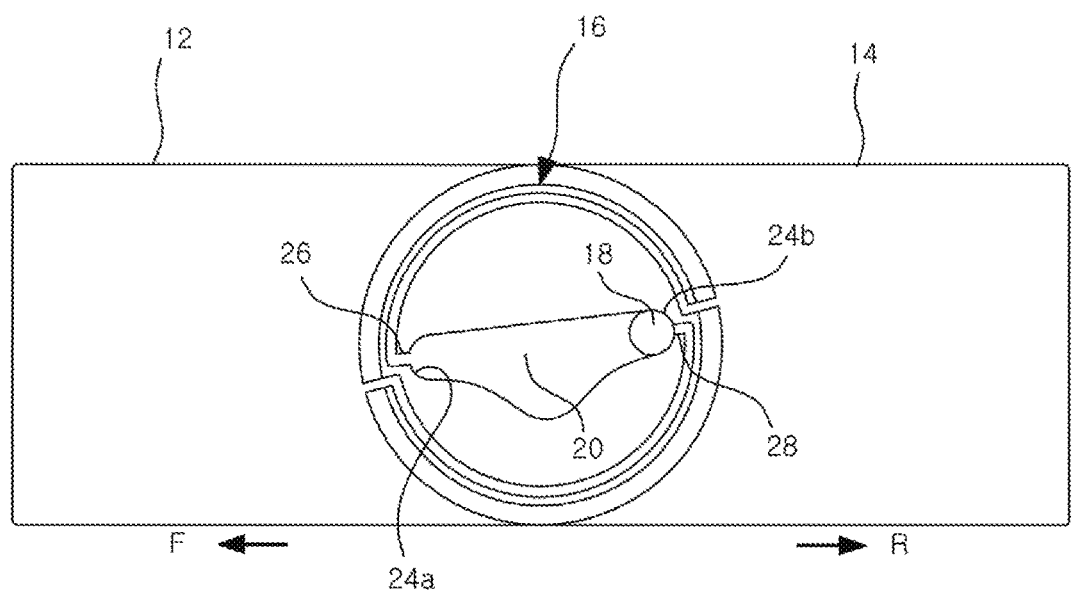
FIG. 4 is an exemplary sectional view showing an example in which a valve assembly according to another embodiment of the present invention is applied to a slipper.

In a second embodiment of the present invention to be described below, it is assume that the check ball 18 is made of a material having buoyancy, that is, a material having smaller specific gravity than a fluid. In a description of the second embodiment, the same elements as those of the first embodiment are assigned the same reference numerals as those of the first embodiment. FIG. 4 shows the state in which a user has worn the slipper 100 using the front F as a forward direction in the same state as the state of the slipper 100 shown in FIG. 1. In this state, since the check ball 18 rises up due to its buoyancy, it closely contacts the second check ball seating portion 24b and clogs the second connecting portion 28.

In this state, the fluid cannot exit from the internal passage 20 to the second connecting portion 28. In contrast, the fluid can enter into the internal passage 20 through the second connecting portion 28. The present embodiment is different from the first embodiment in that the second connecting portion 28 is connected to the first fluid casing 12 and the first fluid connecting portion 26 is connected to the second fluid casing 14.

That is, the present embodiment is different from the first embodiment in that the check ball 18 is made of a material having buoyancy with respect to a fluid and the first connecting portion 26 and the second connecting portion 28 are connected to different fluid casings. Furthermore, a substantial operation is the same as that of the first embodiment.

And when the rotating shaft 16 is rotated clockwise and becomes a state opposite to the state of FIG. 4, that is, the state in which the first check ball seating portion 24a is higher, the check ball 18 closely contacts to the first check ball seating portion 24a at a high position as described above due to buoyancy. Thus the fluid can flow only in a direction opposite the aforementioned direction.

As described above, in the present invention, the valve assembly 10 can be applied to the slipper and configured to control the flow direction of the fluid depending on the rotation direction of the foot top rack of the slipper 100. If the valve assembly 10 according to an embodiment of the present invention is applied to the slipper, the slipper operates so that a user can wear the slipper in both directions.

Furthermore, the rotating shaft of the valve assembly according to an embodiment of the present invention can be rotatably installed in other structures or parts. The valve assembly according to an embodiment of the present invention may be applied to any portion which controls the flow direction of a fluid based on the rotation angle of the rotating shaft in any field.

As described above, it is evident that those skilled in the art may change and modify the present invention in various ways without departing from the technical spirit of the present invention and the scope of the present invention should be interpreted based on the appended claims and their equivalents.

What is claimed is:

1. A valve assembly, comprising:
   a rotating shaft having an internal passage formed therein and being rotatable;
   the rotating shaft having a first and a second connecting portions connected to both sides of the internal passage for receiving fluid from the internal passage and sending fluid to the internal passage from outside; and
   a check ball enclosed in the internal passage and adapted to control the direction of fluid flow;
   wherein a first and a second check ball seating portions onto which the check ball is seated are formed on both inner sides of the internal passage; and
   wherein when the internal passage is inclined by a rotation of the rotating shaft, the check ball contacts closely to a lower positioned one of the check ball seating portions due to a gravitational force, and permits a fluid flow in only one direction from the internal passage to one of the first and second connecting portions which is at a higher position.

2. The valve assembly of claim 1, further comprising:
   a first fluid storage casing connected to the first connecting portion of the rotating shaft, and a second fluid storage casing connected to the second connecting portion of the rotating shaft;

wherein the fluid can flow between the first storage casing and the second storage casing in only one direction depending on the position of the check ball.

3. A valve assembly, comprising:

a rotating shaft having an internal passage formed therein and being rotatable;

the rotating shaft having a first and second connecting portions connected to both sides of the internal passage for receiving fluid from the internal passage and sending fluid to the internal passage from outside; and a check ball enclosed in the internal passage and adapted to control the direction of fluid flow;

wherein a first and a second check ball seating portions onto which the check ball is seated are formed on both inner sides of the internal passage; and wherein when the internal passage is inclined by a rotation of the rotating shaft, the check ball contacts closely to a higher positioned one of the check ball seating portions due to buoyancy, and permits a fluid flow in only one direction from the internal passage to one of the first and second connecting portions which is at a lower position.

4. The valve assembly of claim 3, further comprising:

a first fluid storage casing connected to the first connecting portion of the rotating shaft, and a second fluid storage casing connected to the second connecting portion of the rotating shaft;

wherein the fluid can flow between the first storage casing and the second storage casing in only one direction depending on the position of the check ball.

* * * * *